Oct. 5, 1948.   K. R. HERMAN   2,450,729
POWER TRANSMISSION

Filed Dec. 21, 1945   3 Sheets-Sheet 1

INVENTOR.
KENNETH R. HERMAN
BY
Ralph L. Trusdale
ATTORNEY

Oct. 5, 1948.    K. R. HERMAN    2,450,729
POWER TRANSMISSION
Filed Dec. 21, 1945    3 Sheets-Sheet 2
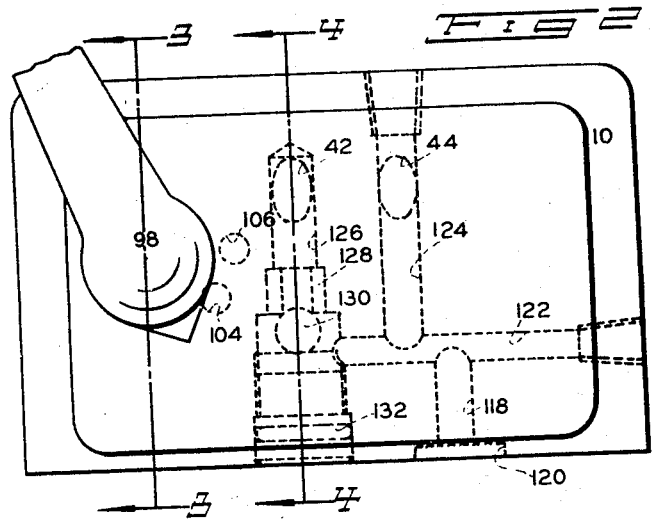
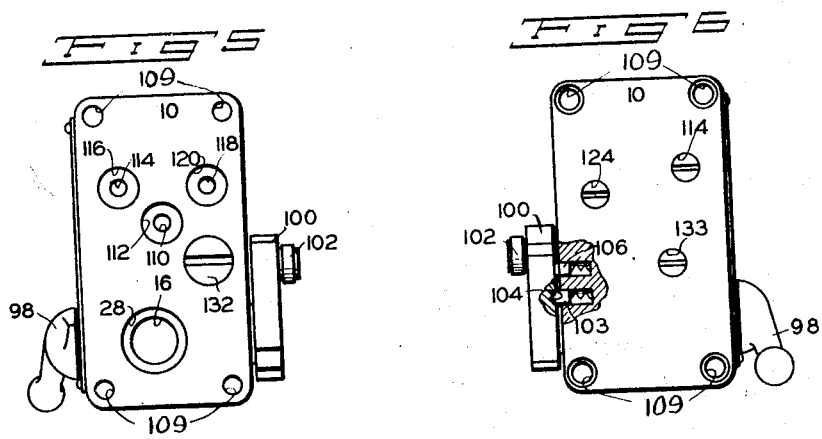
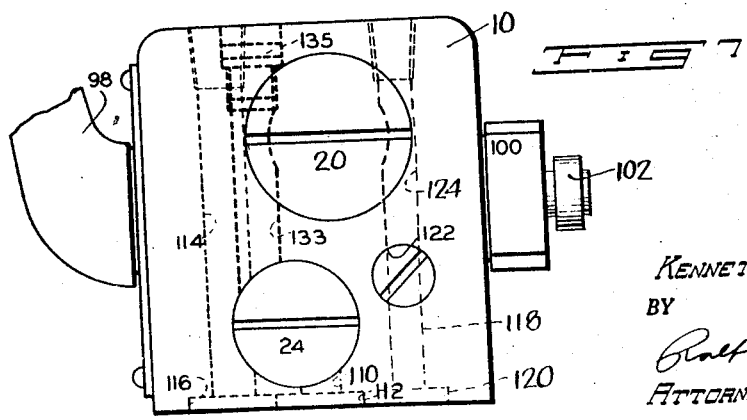
INVENTOR.
KENNETH R. HERMAN
BY
Ralph L. Tweedale
ATTORNEY Oct. 5, 1948.                K. R. HERMAN                2,450,729
                          POWER TRANSMISSION
Filed Dec. 21, 1945                                   3 Sheets-Sheet 3

INVENTOR.
KENNETH R. HERMAN
BY
Ralph L. Tweedale
ATTORNEY

Patented Oct. 5, 1948

2,450,729

UNITED STATES PATENT OFFICE 2,450,729

POWER TRANSMISSION

Kenneth R. Herman, Franklin, Mich., assignor to Vickers Incorporated, Detroit, Mich., a corporation of Michigan Application December 21, 1945, Serial No. 636,322

7 Claims. (Cl. 60—52)

1

This invention relates to power transmissions, particularly to those of the type comprising two or more fluid pressure energy translating devices, one of which may function as a pump and another as a fluid motor.

The invention is more particularly concerned with a control panel for use in a transmission of this character, and which may contain all of the control valves necessary to regulate the fluid flow between the pump and motor to produce rapid advance, feed advance and rapid return motion of the motor as well as to stop the same.

In the class of hydraulic power transmission systems which are commonly used on machine tools, the fluid motor frequently takes the form of a piston and cylinder for imparting rectilinear travel to a machine slide. It is desirable in many such systems to utilize a fixed-displacement fluid pump because of its relatively low cost and to control the speed of the fluid motor by means of a compensated flow control valve comprising an adjustable throttle together with a pressure-operated compensating valve for maintaining a constant pressure drop through the throttle. Likewise in such systems, it has been customary to use a separate four-way reverse valve for directing fluid flow to the motor either fordwardly or reversely, together with speed selector valve means for rendering the flow control valve effective or ineffective.

It is an object of the present invention to provide a control panel for transmissions of this character in which the reverse valve, selector valve and flow control valve functions are combined in an improved manner to eliminate many of the parts otherwise required.

A further object of the present invention is to provide a control panel of this character in which the use of a separate adjustable throttle and a separate speed selector valve is eliminated.

A further object of the present invention is to provide an improved traverse and feed control panel of small size and simple construction which may be produced at low cost and which will perform with utmost reliability.

Further objects and advantages of the present invention will be apparent from the following description, reference being had to the accompanying drawings wherein a preferred form of the present invention is clearly shown.

In the drawings:

Figure 2 is a front view of the control panel.

2

Figure 3:
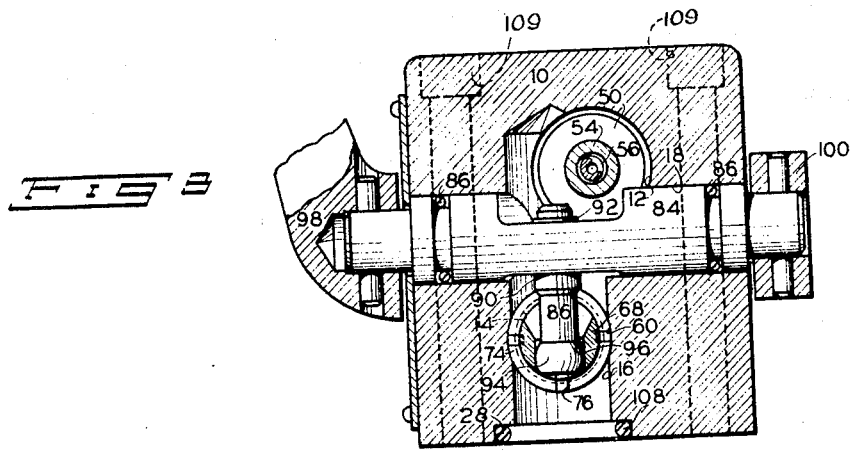

Figure 3 is a transverse sectional view taken on line 3—3 of Figure 2.

Figure 4:
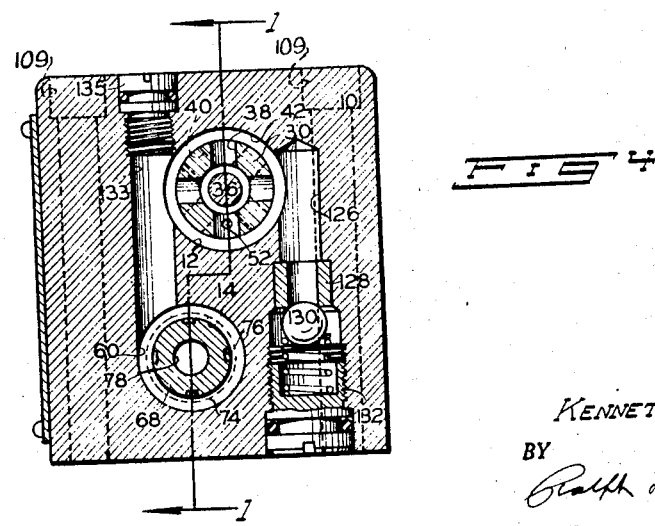

Figure 4 is another transverse sectional view taken on line 4—4 of Figure 2.

Figure 5 is a bottom view of the panel.

Figure 6 is a top view of the panel.

Figure 7 is an end view of the panel.

Figure 8:
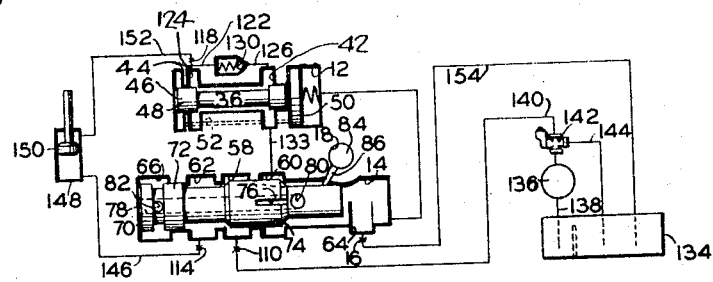

Figure 8 is a diagrammatic view illustrating the circuit of the panel together with the associated elements of a complete power transmission system showing the parts in position for rapid advance.

Figure 9:
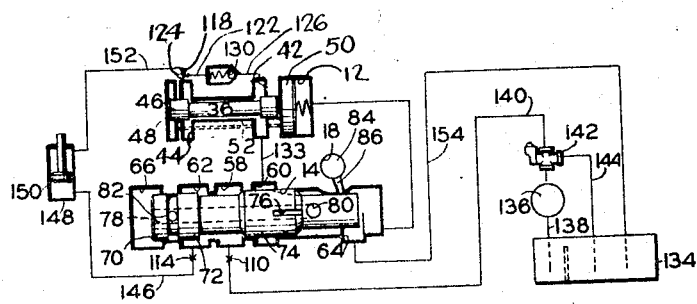

Figure 9 is a view corresponding to Figure 8 showing the parts in position for feed.

Figure 10:
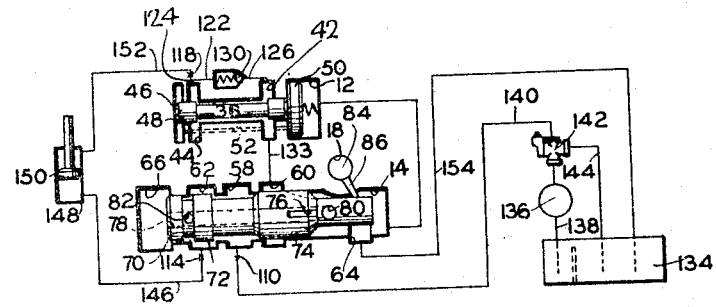

Figure 10 is a view corresponding to Figure 8 showing the parts in stopped position.

Figure 11:
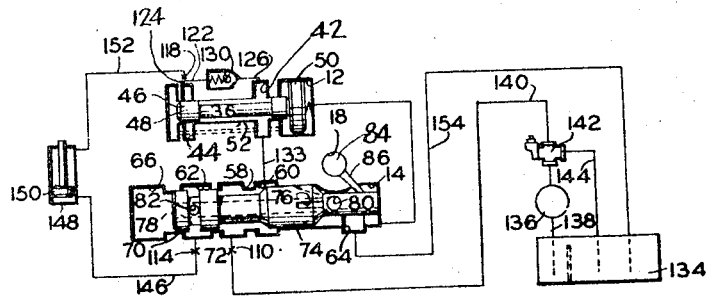

Figure 11 is a view corresponding to Figure 8 showing the parts in rapid return position.

Figure 1:
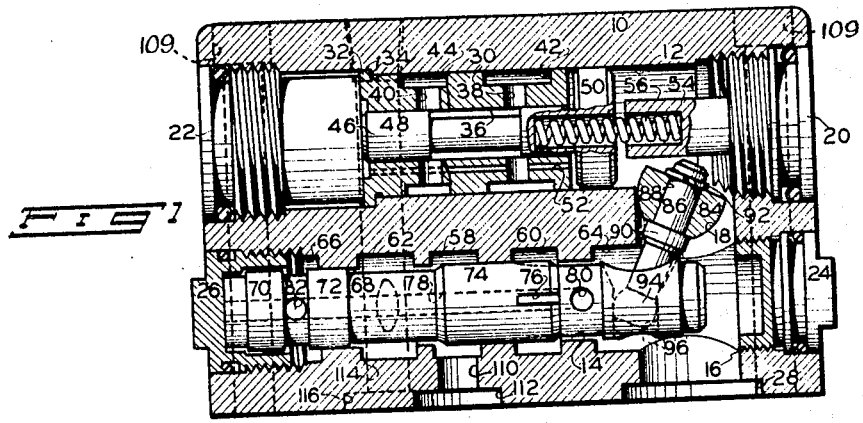
Figure 1 is a longitudinal sectional view taken on the line 1—1 of Figure 4 of a control panel embodying a preferred form of the present invention.

Referring now to the drawings, there is illustrated a panel comprising a rectangular body 10 having two longitudinal bores 12 and 14, these bores are connected at their right-hand end in Figure 1 by a transverse bore 16 at right angles thereto. Positioned at right angles to these three bores is a fourth, transverse, shaft-receiving bore 18 which intersects the bore 16. The ends of the bores 12 and 14 are closed by removable plugs 20, 22, 24 and 26, while the end of bore 16 is open at the bottom and provided with a groove 28 for reception of a sealing ring. Stationarily mounted in the bore 12 is a sleeve member 30 having a flange 32 which is retained against a shoulder 34 by the end plug 22. Sleeve 30 is provided with a central longitudinal bore 36 having two sets of spaced radial ports 38 and 40. These radial ports open outwardly into annular grooves 42 and 44, respectively, which communicate with passages formed in the body later to be described. Slidably mounted in the bore 36 is a compensating valve 46 having a land 48 adapted to close the radial ports 40 when the valve is shifted to the right from the position shown in Figure 1. At its righthand end the spool 46 carries a piston 50 slidable in bore 12 for the purpose of controlling the position thereof. The left-hand face of piston 50, as well as the left-hand end of spool 46, are in communication with the radial port 38 through passage 52. The end plug 20 carries an extension 54 which limits the rightward travel of piston 50. It also serves to support a light spring 56 which biases the valve spool to the left.

The bore 14 is provided with a plurality of annular grooves for the purpose of acting as valve ports. Thus, there is provided a pressure port 58 at the middle, motor ports 60 and 62 at either side thereof, and tank ports 64 and 66 formed by the two ends of bore 14. Slidably mounted in the bore 14 is a reverse valve spool 68 having lands 70, 72 and 74. The land 70 controls no fluid flow but serves as a supporting guide in certain positions of the valve. Land 72 serves to control communication of port 62 with ports 58 and 66, respectively, while land 74 serves to control communication between port 60 and ports 58 and 64, respectively.

The land 74 is considerably longer than the other lands and is provided with a plurality of tapered metering grooves 76 at its right-hand end which, in certain positions of the valve, serve to restrict the flow from port 60 to port 64 in variable degree depending upon the position of the spool. In the position illustrated in Figure 1, such flow is unrestricted to any significant extent. The spool 68 is provided with a central longitudinal passage 78 extending from its left-hand end to a point to the right of the land 74 where it terminates in transverse radial passage 80. A second similar passage 82 is provided intermediate the lands 70 and 72.

For the purpose of operating the spool 68, a shaft 84 is mounted in the bore 18 and provided with ring seals 86 at its opposite ends. At its midportion, the shaft 84 is flattened, as illustrated, for the reception of suitable motion converting means to transform oscillating movement of shaft 84 into rectilinear movement of spool 68. For this purpose, a radial arm 86 is secured to the shaft 84 in a bore 88 by means of a shoulder 90 and snap ring 92. The arm 86 has a spherical head 94 which is slidable in a transverse bore 96 formed in the spool 68. Thus, the arm 86 serves not only to operate spool 68, but also, to prevent rotation thereof.

The shaft 84 is provided with a manual operating handle 98 at one end and with a lever 100 at its other end which may carry a roller 102, see Figures 5 and 6, adapted to be engaged by suitable operating dogs on a machine slide in the well-known manner. A spring pressed detent 103 is positioned in the body adjacent the lever 100 for reception in one or more of a plurality of recesses 104 while a spring pressed frictional retainer 106 is provided to hold the lever in position intermediate the positions established by the detent 103.

The panel is adapted to be connected to an operating circuit by means of connections in the block 10 opening into the bottom face of the block in Figure 1. Thus, the panel may be mounted on a base not shown having corresponding passages adapted to register with the connection ports in the panel and sealed by suitable sealing rings 108. Vertical bolt holes 109 are provided at the four corners of the block for this purpose.

The transverse bore 16 serves as the exhaust connection port. A pressure connection port 110 having a seal receiving groove 112 communicates directly with the pressure port 58. Likewise, a motor connection 114 having a seal receiving groove 116 communicates directly with the motor port 62. A second motor port 118 having a seal receiving groove 120, see Figure 2, communicates with a small longitudinal passage 122 which, in turn, communicates with a vertical passage 124 intersecting the bore 12 at a point in register with the groove 44 of the sleeve 30. Also intersecting the bore 12, but at a point in register with the groove 42, is a stepped bore 126, see Figures 2 and 4. This bore is provided with a pressed-in valve seat 128 for cooperation with a spring loaded ball check valve 130 and its lower end is closed by a plug 132. The longitudinal bore 122 extends to the bore 126 at a point below the check valve 30 as shown in Figure 2. As shown in Figure 4, a vertical bore 133 communicates between the bore 12 at groove 42 and bore 14 at port 60. This bore is closed at its upper end by a plug 135.

Referring now to Figures 8 through 11, these diagrams represent the internal circuit of the panel together with the other elements of a typical hydraulic power transmission system. Thus, there is represented a tank 134 and a pump 136 having a suction conduit 138 and delivery conduit 140 connected to the pressure connection 110. A suitable relief valve 142 is mounted in the delivery connection 140 and has an overflow conduit 144 leading back to the tank. The motor connection 114 is connected by a conduit 146 to the head end of a cylinder 148 having a piston 150 reciprocable therein. The rod end of the cylinder 148 connects by a conduit 152 to the other motor port 118. The exhaust port formed by the end of bore 16 connects to the tank by a return conduit 154.

In operation, with the parts in the position illustrated in Figures 1 through 8 inclusive, the panel is set for a rapid advance of the piston 150, upwardly, in Figure 8. Under these conditions, relief valve 142 is closed and the entire pump delivery is received at pressure connection 110 and directed by the reverse valve to the motor connection 114 and through conduit 146 to the head end of cylinder 148. The oil discharged from the rod end thereof is received at motor connection 118 passing through passages 122 and 124 to the groove 44 to ports 40 of the compensating valve which are wide open under these conditions and, therefore, the oil passes freely to ports 38 and groove 42 and through bore 133 to the motor port 60 of the reverse valve. From here the flow is unrestricted to the tank port 64 and bore 16 where it is free to return to the tank through conduit 154. During the rapid advance operation, since there is substantially no restriction between ports 60 and 64, the pressure on opposite sides of piston 50 is substantially equalized and the spring 56 holds the valve 46 in its wide open position.

When the piston 150 has moved a predetermined distance, a suitable dog, not shown, will actuate the roller 102 to rotate shaft 84 counterclockwise in Figure 1 to any chosen predetermined position where the metering grooves 76 become effective. Under these conditions, as illustrated in Figure 9, the flow paths are the same as before but due to the restricting action of grooves 76, the flow rate is greatly reduced and the excess delivery from pump 136 overflows at relief valve 142. This results in a constant speed rate being established for piston 150 by reason of the fact that the compensating valve acts to maintain a constant pressure drop across the metering grooves 76.

Should this pressure drop tend to rise, the force on the left face of piston 50 and spool 46 will be temporarily preponderant over the fluid pressure force on the right face plus the force of the spring 56 and thus shift the spool 36 slightly to the right. This increases the restriction at port 40 until a balance is reached where the pressure drop through grooves 76 is again restored to its intended value. Conversely, should this pressure drop decrease, the fluid pressure force on the right face of piston 50 will be predominant and tend to open port 40 wider. Thus, the flow rate through the grooves 76 is maintained constant independently of variations in load on the piston 150.

When the piston 150 has travelled a predetermined distance at feed rate, another dog, not illustrated, may contact the roller 102 to shift the spool 68 into the position shown in Figure 10 to stop the slide. Under these conditions, it will be seen that land 72 no longer blocks communication between ports 62 and 64, thus permitting the pump delivery to flow directly from port 58 to port 82 and through the central passage 78 of the spool back to the exhaust connection formed by bore 16. Thus, the pump is effectively unloaded and there is no force to drive the piston 150.

To return the piston 150, the spool is shifted to the position illustrated in Figure 11 either by hand operation or by suitable automatic means. In this position, the flow from pressure connection 110 is directed through ports 58 and 60 to bore 133, around annular groove 42 to bore 126, through check valve 128 and 130 and passage 122 to the motor connection 118. From there, it is directed through conduit 152 to the rod end of cylinder 148, and the oil discharged from the head end passes through conduit 146 to the motor connection 114 where it flows through the port 82 and central bore 78 of valve 68, exhaust connection 16 and return pipe 154 to tank 134. Under these conditions, relief valve 142 remaining closed, the full delivery of the pump is available to rapidly return the piston 150 and the flow is unrestricted throughout the circuit.

It will thus be seen that there has been provided a compact, simple control panel in which the functions of a reverse valve, a flow control valve and a speed selector valve have been combined with the elimination of several parts otherwise necessary. Thus there is no separate throttle valve such as has been heretofore required in association with the compensating valve, and neither is there any separate speed selector valve which has been previously provided either as a separate valve by-passing the flow control valve, or as additional lands and ports on the reverse valve. It will be noted that the reverse valve of the present invention has only two effective lands on the spool controlling the flow between five ports which are no more lands and ports than are necessary for a simple four-way reverse valve.

In addition, it will be seen that the present invention provides a panel in which the body is of utmost simplicity in construction requiring no complicated coring, and in which the main parts are located in two parallel, longitudinal bores connected by a simple, straight, transverse bore and intersected by a fourth, shaft-receiving bore at right angles to these three. Thus, the body lends itself readily to low cost manufacture by simple drilling and boring operations.

While the form of embodiment of the invention as herein disclosed constitutes a preferred form, it is to be understood that other forms might be adopted, all coming within the scope of the claims which follow.

What is claimed is as follows:

1. A self-contained hydraulic control panel for providing rapid traverse and feed strokes in a hydraulic power transmission, the panel comprising in combination a body having external connections for pressure supply and exhaust and two external motor connections, a reverse valve in the body effective to selectively establish forward and reverse flow paths between the pressure and exhaust connections and the motor connections, and having a substantial range of travel during which flow in one of the paths is adjustably restrictable, a compensating valve also in the body and connected to control flow between the reverse valve and one of the connections, and means for operating the compensating valve in response to the pressure ahead of and beyond the restrictable part of the reverse valve to maintain a substantially constant pressure drop therethrough.

2. A self-contained hydraulic control panel for providing rapid traverse and feed strokes in a hydraulic power transmission, the panel comprising in combination a body having external connections for pressure supply and exhaust and two external motor connections, a reverse valve in the body effective to selectively establish forward and reverse flow paths between the pressure and exhaust connections and the motor connections, and having a substantial range of travel during which flow in one of the paths is adjustably restrictable, a compensating valve also in the body and connected to control flow between the reverse valve and one of the motor connections, means for operating the compensating valve in response to the pressure ahead of and beyond the restrictable part of the reverse valve to maintain a substantially constant pressure drop therethrough, and a check valve in parallel with the compensating valve.

3. A self-contained hydraulic control panel for providing rapid traverse and feed strokes in a hydraulic power transmission, the panel comprising in combination a body having external connections for pressure supply and exhaust and two external motor connections, a reverse valve in the body effective to selectively establish forward and reverse flow paths between the pressure and exhaust connections and the motor connections, and having a substantial range of travel during which flow through one of the motor connections is adjustably restrictable, a compensating valve also in the body and connected to control flow between the reverse valve and one of the connections, and means for operating the compensating valve in response to the pressure ahead of and beyond the restrictable part of the reverse valve to maintain a substantially constant pressure drop therethrough.

4. A self-contained hydraulic control panel for providing rapid traverse and feed strokes in a hydraulic power transmission, the panel comprising in combination a body having external connections for pressure supply and exhaust and two external motor connections, a reverse valve in the body effective to selectively establish forward and reverse flow paths between the pressure and exhaust connections and the motor connections, and having a substantial range of travel during which flow through one of the motor connections is adjustably restrictable, a compensating valve also in the body and connected to control flow between the reverse valve and one of the connections, means for operating the compensating valve in response to the pressure ahead of and beyond the restrictable part of the reverse valve to maintain a substantially constant pressure drop therethrough, and a check valve in parallel with the compensating valve.

5. A self-contained hydraulic control panel for providing rapid traverse and feed strokes in a hydraulic power transmission, the panel comprising in combination a body having external connections for pressure supply and exhaust and two external motor connections, means forming a pair of longitudinal, parallel, valve bores side-by-side in the body, a reverse valve in one bore and a compensating valve in the other bore, means forming a large transverse connecting bore intersecting both valve bores, means forming a shaft bore perpendicular to the three other bores and spaced from the axis of the reverse valve, an operating shaft oscillatable in the shaft bore, motion-converting means positioned in the transverse bore for causing longitudinal movement of the reverse valve upon oscillation of the operating shaft, and passages connecting the reverse valve and compensating valve to control flow between the pressure and exhaust connections and the motor connections.

6. A self-contained hydraulic control panel for providing rapid traverse and feed strokes in a hydraulic power transmission, the panel comprising in combination a body having external connections for pressure supply and exhaust and two external motor connections, means forming a pair of longitudinal, parallel, valve bores side-by-side in the body, a reverse valve in one bore and a compensating valve in the other bore, means forming a large transverse connecting bore perpendicular to and intersecting both valve bores, means forming a shaft bore perpendicular to the three other bores and spaced from the axis of the reverse valve, an operating shaft oscillatable in the shaft bore, motion-converting means positioned in the transverse bore for causing longitudinal movement of the reverse valve upon oscillation of the operating shaft, and passages connecting the reverse valve and compensating valve to control flow between the pressure and exhaust connections and the motion connections.

7. A self-contained hydraulic control panel for providing rapid traverse and feed strokes in a hydraulic power transmission, the panel comprising in combination a body having external connections for pressure supply and exhaust and two external motor connections, means forming a pair of longitudinal, parallel, valve bores side-by-side in the body, a reverse valve in one bore and a compensating valve in the other bore, means forming a large transverse connecting bore intersecting both valve bores, means forming a shaft bore perpendicular to the three other bores and spaced from the axis of the reverse valve, an operating shaft oscillatable in the shaft bore, motion-converting means positioned in the transverse bore for causing longitudinal movement of the reverse valve upon oscillation of the operating shaft, and passages connecting the reverse valve and compensating valve to control flow between the pressure and exhaust connections and the motor connections, said transverse bore extending to one face of the body to form the exhaust connection.

KENNETH R. HERMAN.

REFERENCES CITED

The following references are of record in the file of this patent:

UNITED STATES PATENTS

| Number | Name | Date |
|---|---|---|
| 2,267,177 | Twyman | Dec. 23, 1941 |
| 2,378,680 | Arms | June 19, 1945 |
| 2,400,729 | Alden | May 21, 1946 |